(12) United States Patent
Jung et al.

(10) Patent No.: US 12,362,443 B2
(45) Date of Patent: Jul. 15, 2025

(54) BATTERY MODULE IN WHICH CONNECTION BETWEEN ELECTRODE LEAD AND VOLTAGE SENSING MEMBER IS SIMPLIFIED, AND BATTERY PACK INCLUDING THE SAME

(71) Applicant: LG Energy Solution, Ltd., Seoul (KR)

(72) Inventors: Ki-Taek Jung, Daejeon (KR); Jun-Kyu Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 576 days.

(21) Appl. No.: 17/776,443

(22) PCT Filed: Jul. 9, 2021

(86) PCT No.: PCT/KR2021/008842
§ 371 (c)(1),
(2) Date: May 12, 2022

(87) PCT Pub. No.: WO2022/019549
PCT Pub. Date: Jan. 27, 2022

(65) Prior Publication Data
US 2022/0407196 A1 Dec. 22, 2022

(30) Foreign Application Priority Data
Jul. 22, 2020 (KR) .................. 10-2020-0091068

(51) Int. Cl.
*H01M 50/569* (2021.01)
*H01M 10/48* (2006.01)
(Continued)

(52) U.S. Cl.
CPC ....... *H01M 50/569* (2021.01); *H01M 10/482* (2013.01); *H01M 50/211* (2021.01);
(Continued)

(58) Field of Classification Search
CPC ............ H01M 50/569; H01M 50/519; H01M 50/262; H01M 50/517; H01M 50/211;
(Continued)

(56) References Cited

U.S. PATENT DOCUMENTS

2012/0328908 A1   12/2012   Han et al.
2017/0104247 A1   4/2017    Son
(Continued)

FOREIGN PATENT DOCUMENTS

CN   104737325 A   6/2015
CN   107112482 A   8/2017
(Continued)

OTHER PUBLICATIONS

Machine Translation of Japanese Patent Publication No. 2008-186725 (Year: 2008).*
(Continued)

*Primary Examiner* — Wyatt P McConnell
(74) *Attorney, Agent, or Firm* — Lerner David LLP

(57) ABSTRACT

Disclosed herein is a battery module. The battery module can includes a cell stack having battery cells stacked in one direction and at least one lead overlapping portion formed as electrode leads of the battery cells overlap each other, and a voltage sensing member. The voltage sensing member can have at least one sensing part directly connected to the at least one lead overlapping portion. Each lead overlapping portion and each sensing part can be fixed and combined by a rivet member.

20 Claims, 8 Drawing Sheets

(51) Int. Cl.
  *H01M 50/211* (2021.01)
  *H01M 50/262* (2021.01)
  *H01M 50/503* (2021.01)
  *H01M 50/517* (2021.01)
  *H01M 50/519* (2021.01)
(52) U.S. Cl.
  CPC ....... *H01M 50/262* (2021.01); *H01M 50/503* (2021.01); *H01M 50/517* (2021.01); *H01M 50/519* (2021.01); *H01M 2220/20* (2013.01)
(58) Field of Classification Search
  CPC .............. H01M 50/503; H01M 10/482; H01M 2220/20
  See application file for complete search history.

(56) References Cited

U.S. PATENT DOCUMENTS

| | | |
|---|---|---|
| 2017/0331097 A1 | 11/2017 | Lee et al. |
| 2017/0352851 A1 | 12/2017 | Kuboki et al. |
| 2020/0144580 A1 | 5/2020 | Hong et al. |
| 2021/0194101 A1 | 6/2021 | Kim et al. |
| 2021/0313657 A1 | 10/2021 | Park et al. |

FOREIGN PATENT DOCUMENTS

| | | |
|---|---|---|
| CN | 111029516 A | 4/2020 |
| CN | 111279515 A | 6/2020 |
| JP | 2007299893 A | 11/2007 |
| JP | 2008181822 A | 8/2008 |
| JP | 2015115190 A | 6/2015 |
| JP | 5750097 B2 | 7/2015 |
| KR | 20140144941 A | 12/2014 |
| KR | 20150062777 A | 6/2015 |
| KR | 20160077765 A | 7/2016 |
| KR | 20160003665 U | 10/2016 |
| KR | 20170017132 A | 2/2017 |
| KR | 2017-0042066 A | 4/2017 |
| KR | 20170050509 A | 5/2017 |
| KR | 20170055719 A | 5/2017 |
| KR | 101835582 B1 | 3/2018 |
| KR | 20190071454 A | 6/2019 |
| KR | 20190124022 A | 11/2019 |
| KR | 2020-0040619 A | 4/2020 |
| KR | 20200059686 A | 5/2020 |

OTHER PUBLICATIONS

International Search Report for PCT/KR2021/008842 dated Oct. 26, 2021. 3 pgs.
Extended European Search Report including Written Opinion for Application No. 21846241.4 dated Oct. 11, 2024, pp. 1-6.
Search Report dated Mar. 27, 2025 from the Office Action for Chinese Application No. 202180006534.3 Issued Mar. 28, 2025, pp. 1-3.

* cited by examiner

BATTERY MODULE IN WHICH CONNECTION BETWEEN ELECTRODE LEAD AND VOLTAGE SENSING MEMBER IS SIMPLIFIED, AND BATTERY PACK INCLUDING THE SAME

CROSS-REFERENCE TO RELATED APPLICATIONS

The present application is a national phase entry under 35 U.S.C. § 371 of International Application No. PCT/KR2021/008842 filed on Jul. 9, 2021, which claims priority to Korean Patent Application No. 10-2020-0091068 filed on Jul. 22, 2020, in the Republic of Korea, the disclosures of both of which are incorporated herein by reference in their entirety.

TECHNICAL FIELD

The present disclosure relates to a battery module, and more particularly, to a battery module in which a connection structure between a voltage sensing member and electrode leads of battery cells is improved for voltage sensing of the battery cells in the battery module, and a battery pack including the battery module.

BACKGROUND ART

Semi-permanent batteries, which convert electric energy into a form of chemical energy and are capable of being repeatedly charged and discharged, are referred to as secondary batteries to be distinguished from primary batteries that are unable to be reused after being used once.

The secondary batteries include a lithium secondary battery, a nickel cadmium (Ni-Cd) battery, a lead storage battery, a nickel metal hydride (Ni-MH) battery, a zinc-air battery, an alkaline manganese battery, and the like. Thereamong, the lead storage battery and the lithium secondary battery are most actively commercialized secondary batteries.

In particular, the lithium secondary battery is recently actively used as an electric vehicle battery, due to advantages, such as high energy storage density, potential for weight-lightening and miniaturization, excellent stability, low discharge rate, and long-life. For reference, the lithium secondary battery is generally classified into a cylindrical type, an angular type, and a pouch type depending on a manufacturing type, and a purpose of use thereof spans an electronic switching system (ESS) battery, another electric device, and the like, in addition to the electric vehicle battery.

Currently, one lithium secondary battery (cell) is unable to obtain an output sufficient enough to drive an electric vehicle. To apply a secondary battery as an energy source of an electric vehicle, a battery module in which a plurality of lithium ion battery cells are connected in series and/or in parallel needs to be configured, and generally, a battery pack including a battery management system (BMS), a cooling system, a battery disconnection unit (BDU), electric wiring cables, and the like, which connect the battery modules in series and functionally maintain the same, is configured.

As shown in FIG. 1, when a battery module is configured with a pouch type secondary battery cell, electrode leads 1a and 1b of the pouch type secondary battery cell are welded to a bus bar 3 via a laser. The bus bar 3 is located at a front portion or at the front portion and a rear portion of the battery module, and the plurality of electrode leads 1a and 1b are welded per one bus bar 3, and thus the secondary battery cells are connected in series and in parallel.

Voltage information of the secondary battery cells in the battery module is transmitted to a BMS via a sensing member 5 connected to each bus bar 3, and the BMS controls charging and discharging of the secondary battery cells by monitoring a state of each secondary battery cell, based on the voltage information.

A harness wire, a flat flexible cable (FFC), a flexible printed circuit board (FPCB), or the like is used as the sensing member 5, and in the prior art, the sensing member 5 and the bus bar 3 are electrically connected by compressing a welding terminal 6 to an end portion of the sensing member 5 and welding the sensing member 5 to the bus bar 3 via a laser.

However, a method of indirectly connecting the electrode leads 1a and 1b and the sensing member 5 via the bus bar 3 as a medium as described above is costly in terms of expenses, and it is not easy to manage quality of laser welding.

DISCLOSURE

Technical Problem

The present disclosure is designed to solve the problems of the prior art, and therefore the present disclosure is directed to simplifying an assembling process of a battery module by directly connecting electrode leads of battery cells to corresponding sensing parts of a voltage sensing member, without using a bus bar.

The technical problems to be solved in the present disclosure are not limited to the above, and other problems that are not mentioned could be clearly understood by one of ordinary skill in the art from the description of the present disclosure below.

Technical Solution

In one aspect of the present disclosure, there is provided a battery module including: a cell stack having battery cells stacked in one direction and at least one lead overlapping portion formed as electrode leads of the battery cells overlap each other; and a voltage sensing member having at least one sensing part directly connected to the at least one lead overlapping portion, wherein each one lead overlapping portion and each sensing part are fixed and combined by a rivet member.

The battery module may further include a support frame having slits formed every predetermined interval along a stack direction of the battery cells, and the support frame being disposed at a front portion or rear portion of the cell stack, wherein each lead overlapping portion may be extracted to a front portion of the support frame through each of the slits and arranged to face a surface of the support frame.

Each sensing part, each lead overlapping portion, and the support frame may be integrally fixed and combined by the rivet member.

Each sensing part, each lead overlapping portion, and the support frame may have holes that match each other, and the rivet member may be a blind rivet interposed in the holes.

The battery module may further include a lead holding member having a first holding bar adhered to the front portion of the support frame so that a connection portion of the lead overlapping portion and the sensing part is provided between the first holding bar and the support frame, the lead holding member being detachably provided at the support frame.

The lead holding member may include: a shaft combined to a lower portion of the support frame via a hinge and connected to the first holding bar; and a second holding bar connected to the shaft and extending in parallel from a location spaced apart from the first holding bar by a predetermined interval.

The support frame may include at least one latch provided to be combined and locked to the first holding bar.

The voltage sensing member may include: a first main body portion disposed to extend in a longitudinal direction of the cell stack at a top portion of the cell stack; and a second main body portion extending in a width direction of the cell stack from both end portions of the first main body portion, wherein each of the at least one sensing part may extend from the second main body portion to contact each of the at least one lead overlapping portion.

The voltage sensing member may be formed of a flat flexible cable (FFC) or a flexible printed circuit board (FPCB).

In another aspect of the present disclosure, there is provided a battery pack including the battery module.

In another aspect of the present disclosure, there is provided a vehicle including the battery pack.

Advantageous Effects

A battery module according to the present disclosure may have a simplified assembly structure as electrode leads of battery cells and corresponding sensing parts of a voltage sensing member can be directly connected and fixed via a rivet, without using a bus bar.

Also, according to the present disclosure, manufacturing costs can be reduced by riveting an electrode lead and a voltage sensing member without a bus bar, compared to a connection method between an electrode lead, a bus bar, and a voltage sensing member according to a laser welding method of the prior art.

The effects of the present disclosure are not limited to the above, and effects that are not mentioned could be clearly understood by one of ordinary skill in the art from the present specification and accompanying drawings.

MODE FOR DISCLOSURE

Figure 1:
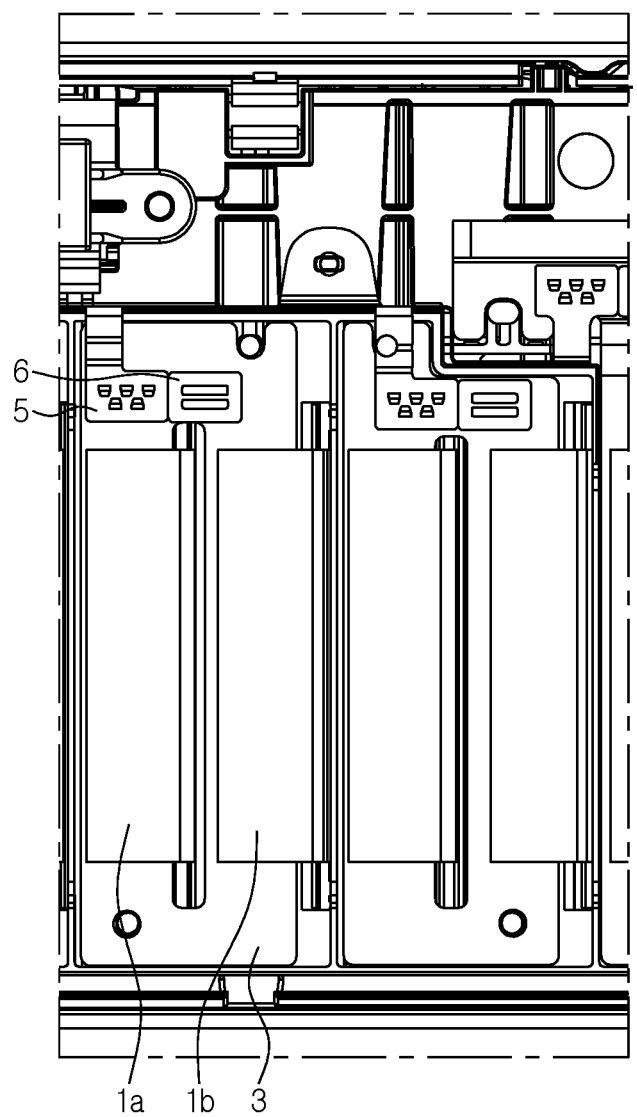
FIG. 1 is a view showing a portion of a battery module according to the prior art.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Embodiments of the present disclosure are provided to further fully describe the present disclosure to one of ordinary skill in the art, and thus shapes and sizes of elements in the drawing may be exaggerated, omitted, or schematically shown for a clearer description. Thus, the size or scale of each element does not entirely reflect the actual size or scale.

Figure 2:
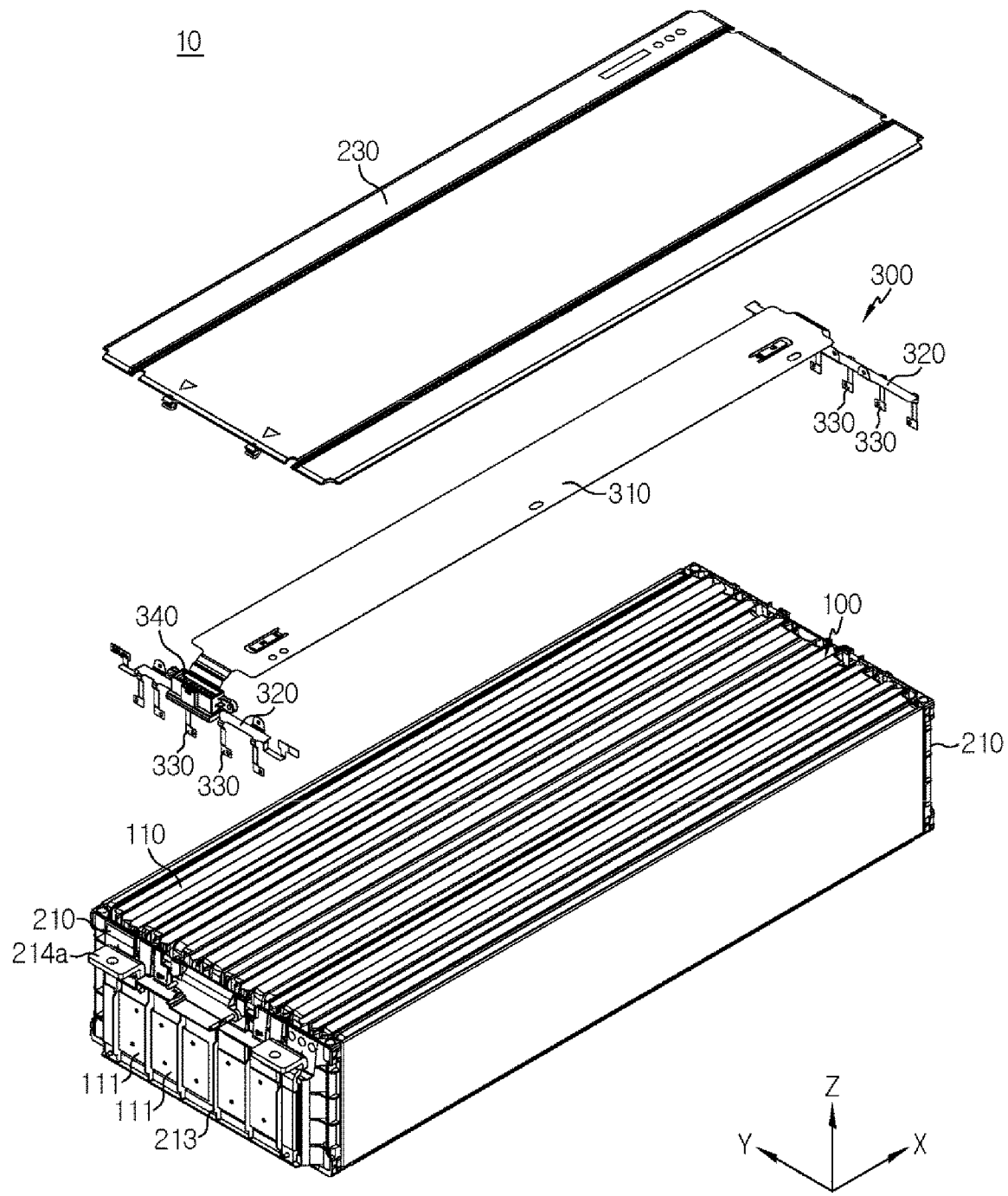
FIG. 2 is a partial exploded perspective view of a battery module according to an embodiment of the present disclosure.
Figure 3:
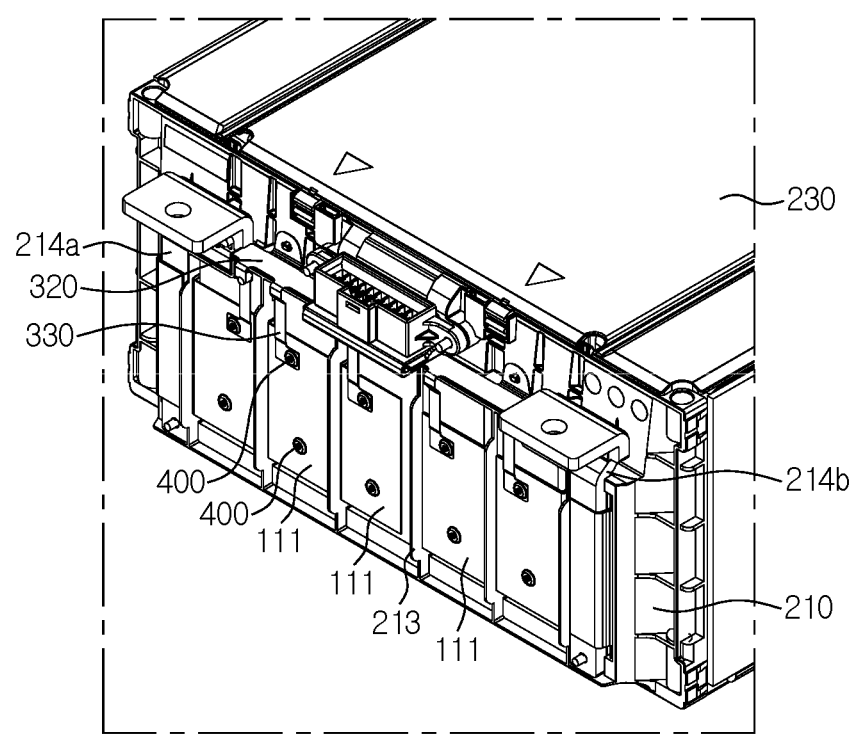
FIG. 3 is a perspective view showing a front portion of a battery module, according to an embodiment of the present disclosure.
Figure 4:
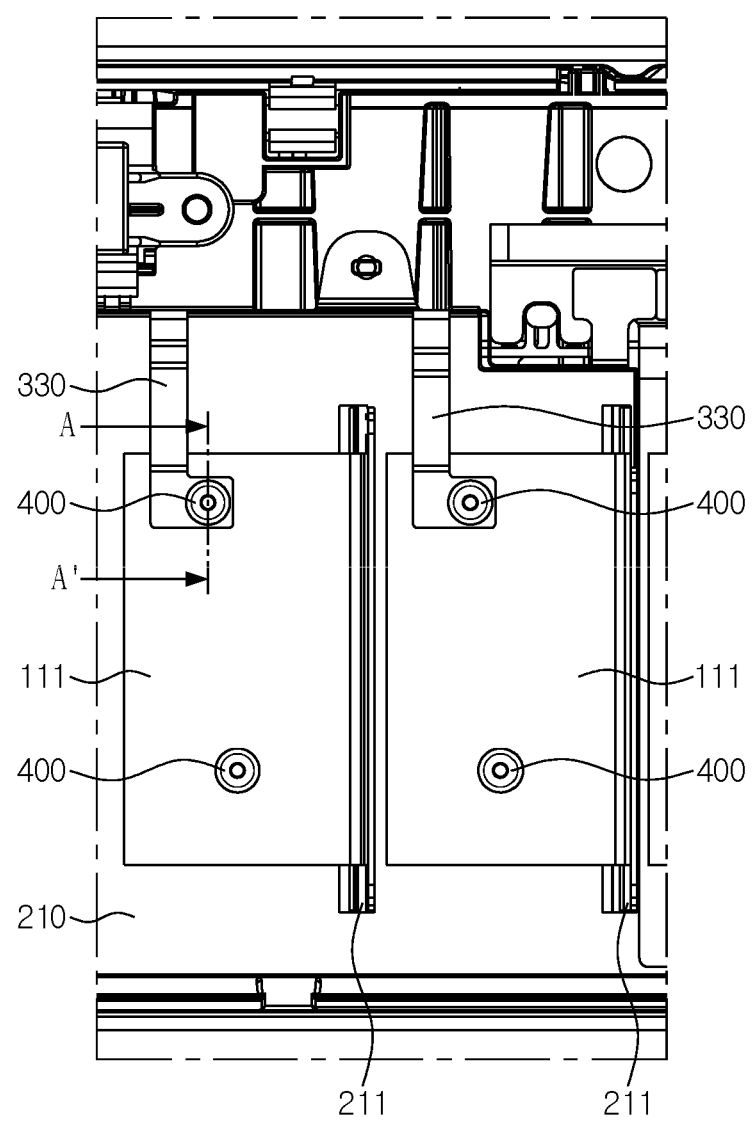
FIG. 4 is a partial enlarged front view of the batter module of FIG. 3.
Figure 5:
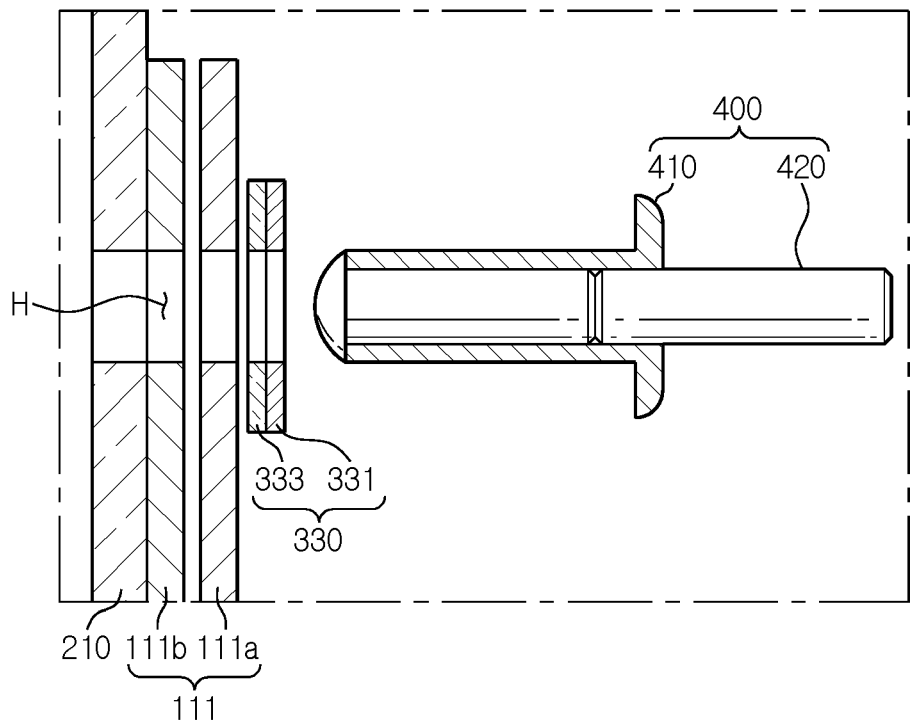
FIG. 5 is a side view taken at section A-A' of FIG. 4 showing a step of a riveting process of an electrode lead and a sensing part.

FIG. 2 is a partial exploded perspective view of a battery module according to an embodiment of the present disclosure, FIG. 3 is a view showing a front portion of a battery module, according to an embodiment of the present disclosure, and FIG. 4 is a partial enlarged view of FIG. 3.

Referring to FIGS. 2 through 4, a battery module 10 according to an embodiment of the present disclosure may include a cell stack 100, a support frame 210, and a voltage sensing member 300.

The cell stack 100 is an assembly including battery cells 110. The battery cells 110 are each erected in an up-and-down direction (±Z) and stacked in a right-and-left direction (±Y) to form one cell stack 100.

A buffer pad, a cooling pin, or the like may be further added between the battery cells 110. The buffer pad or the cooling pin may perform a function for absorbing a shock or efficiently emitting heat of each battery cell 110 to the outside.

A pouch type battery cell or an angular type battery cell may be applied as a battery cell, and in the present embodiment, the pouch type battery cell 110 is applied.

Although not illustrated in detail, the pouch type battery cell 110 may include an electrode assembly, an electrolyte, and a pouch exterior material for sealing and accommodating the electrode assembly and the electrolyte.

The electrode assembly may have a stack structure of a positive electrode plate/separation film/negative electrode plate, the positive electrode plate and the negative electrode plate include electrode tabs, and at least one electrode tab is connected to an electrode lead. The electrode lead extends from the inside to the outside of the pouch exterior material to function as an electrode terminal of the battery cell 110.

Here, the electrode lead collectively refers to a positive electrode lead 111a and a negative electrode lead 111b.

The pouch exterior material protects internal elements, such as the electrode assembly, the electrolyte, and the like, and may be configured in a form including a metal thin film, for example, an aluminum thin film, to supplement an electrochemical property by the electrode assembly and the electrolyte and enhance heat dissipation or the like. The aluminum thin film may be disposed between an internal adhesive layer and an insulation layer formed of an insulating material, so as to secure electric insulation.

In particular, in the battery module 10 according to the present disclosure, the electrode leads of the adjacent battery cells 110 overlap each other in a pre-determined pattern and thus the battery cells 110 are connected in series or in series and parallel.

For example, when it is assumed that any one battery cell 110 is an $N^{th}$ cell, the following battery cells 110 are sequentially an $(N+1)^{th}$ cell, an $(N+2)^{th}$ cell, and so on, and each battery cell 110 is arranged to face the adjacent battery cell 110 such that polarities are in opposite directions, along a stack direction (Y-axis), the positive electrode lead 111a of the $N^{th}$ cell and the negative electrode lead 111b of the $(N+1)^{th}$ cell are stacked at a front portion of the cell stack 100 and the positive electrode lead 111a of the $(N+1)^{th}$ cell and the negative electrode lead 111b of the $(N+2)^{th}$ cell are stacked at a rear portion of the cell stack 100. The electrode leads of the battery cells 110 are stacked in such a pattern and are fixed with a rivet member 400 described below to connect the battery cells 110 in series.

As another example, by forming two to three consecutive battery cells 110 as one group, same groups may be arranged such that polarities face a same direction and positive electrode leads of one group and negative electrode leads of another group may be stacked and integrally riveted, thereby connecting the battery cells 110 in series and in parallel.

A configuration in which the electrode leads are stacked to connect the battery cells 110 in series or in series and parallel as such is hereinafter referred to as a lead overlapping portion 111.

The support frame 210 is a unit for supporting the cell stack 100, and may be provided at each of the front portion and the rear portion of the cell stack 100.

The support frame 210 includes slits 211 formed every predetermined interval along the stack direction (±Y) of the battery cells 110. The lead overlapping portion 111 of the cell stack 100 may be extracted to a front portion of the support frame 210 through the slits 211. The lead overlapping portion 111 that passed through the slits 211 may be bent to face a surface of the support frame 210. An isolation plate 213 for preventing a short by an arbitrary metal object may be provided between the bent lead overlapping portions 111.

A top plate frame 230 may be disposed at a top portion of the support frame 210. The top plate frame 230 is a configuration for covering a top end portion of the cell stack 100, and both end portions thereof may be provided to be combined to top end portions of two support frames 210 via hinges.

The voltage sensing member 300 is an element operating to sense a node voltage of the battery cells 110 connected in series, and transmit voltage information of each battery cell 110 to a battery management system (BMS) (not shown). The BMS monitors states of the battery cells 110 via the voltage sensing member 300 and controls charging and discharging of the battery cells 110.

The voltage sensing member 300 may be implemented by a film cable, such as a flexible printed circuit board (FPCB) or a flat flexible cable (FFC).

The FPCB may be manufactured by arranging a copper foil stack plate on a base film, laminating a dry film, performing exposure, development, and etching processes to form conductor lines having regular intervals, and then adhering a coverlay film. Also, the FFC may be manufactured by arranging conductor lines on a base film at regular intervals, and then laminating a coverlay thereon.

The voltage sensing member 300 having such a film cable form has excellent conduction performance of conductor lines and perfectly secures insulation between the conductor lines by using one insulation film, and thus a large number of signals may be processed with minimum volume.

Referring to FIG. 2, the voltage sensing member 300 according to the present disclosure is manufactured in a form of a FPCB, and includes a first main body portion 310 disposed to extend in a longitudinal direction (±X-axis) of the cell stack 100 at a top portion of the cell stack 100, a second main body portion 320 extending in a width direction (±Y-axis) of the cell stack 100 from both end portions of the first main body portion 310, and sensing parts 330 is disposed to extend at locations corresponding to the lead overlapping portions 111 of the cell stack 100, respectively, from the second main body portion 320. A connector 340 may be mounted on one side of the second main body portion 320, and a signal may be transmitted or received to or from the connector 340 by accessing another cable connector connected to the BMS.

For reference, the voltage sensing member 300 being disposed at the top portion of the cell stack 100 is selected for wire distance reduction and installation convenience. When required, the voltage sensing member 300 may be disposed at a location other than the top portion of the cell stack 100.

Hereinafter, an electric connection structure between each sensing part 330 of the voltage sensing member 300 and each lead overlapping portion 111 of the cell stack 100, and a method thereof will be described.

As shown in FIG. 3, a positive electrode terminal 214a and a negative electrode terminal 214b of the battery module 10 may be respectively arranged at a left end portion and a right end portion of the support frame 210, and may be provided in forms of metal bars having top end portions bent externally and horizontally. At the positive electrode terminal 214a, a positive electrode lead of the outermost battery cell 110 at one side in the cell stack 100 may be attached, and at the negative electrode terminal 214b, a negative electrode lead of the outermost battery cell 110 at the other side may be attached.

The electrode leads and sensing parts 330 of the battery cells 110 excluding the electrode leads and sensing parts 330 respectively attached to the positive electrode terminal 214a and negative electrode terminal 214b may be connected directly without a bus bar.

In detail, as shown in FIG. 4, each sensing part 330 extends in a downward direction from the second main body portion 320 and is disposed on a front surface of each lead overlapping portion 111, and an end portion of each sensing part 330 is configured such that one surface of an insulation film 331 is removed and a sensing terminal 333 is exposed. Such an end portion of the sensing part 330 is connected to the lead overlapping portion 111 by the rivet member 400, and thus conduction is achieved.

In other words, the sensing part 330 and the lead overlapping portion 111 including the positive electrode lead 111a and negative electrode lead 111b are combined to each other by the rivet member 400 to be directly electrically connected to each other. Here, it is possible to combine only the sensing part 330 and lead overlapping portion 111 by the rivet member 400, but in the present embodiment, considering that rigidity of the sensing part 330 and lead overlapping portion 111 is somewhat insufficient, the rivet member 400 is configured to be integrally connected to the sensing part 330, lead overlapping portion 111, and support frame 210.

Referring to FIGS. 5 through 8 in detail, one surface of the lead overlapping portion 111 is arranged to face a front surface of the support frame 210, and one surface of the sensing part 330 is arranged to face the other surface of the lead overlapping portion 111. After that, the sensing part 330, lead overlapping portion 111, and support frame 210 are drilled to form holes H that match each other, and the rivet member 400 is interposed in the holes H.

A blind rivet may be employed as the rivet member 400. The blind rivet may include a body 410 and a mandril 420 inserted into the body 410.

Figure 6:
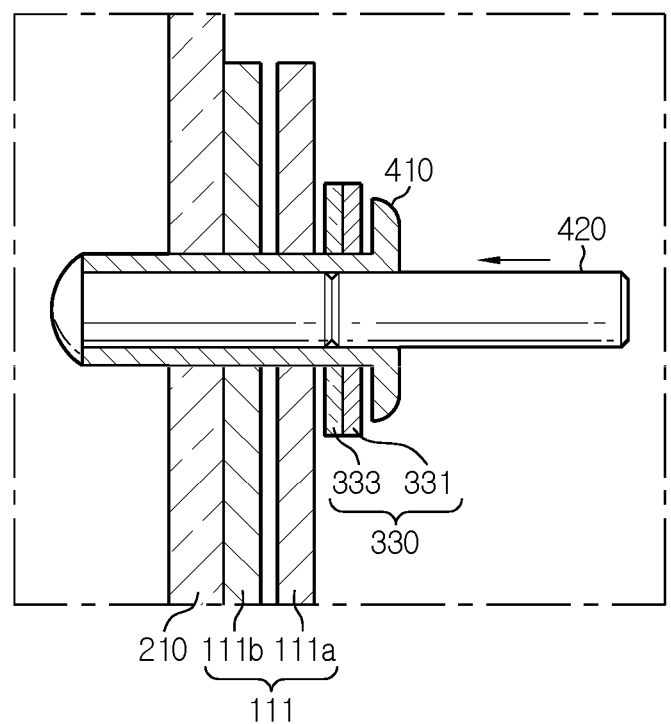
FIG. 6 is a side view taken at section A-A' of FIG. 4 showing another step of the riveting process of the electrode lead and the sensing part.

As shown in FIG. 6, the rivet member 400 is loaded into a tool (not shown) and then inserted into the sensing part 330, lead overlapping portion 111, and support frame 210 through the holes H.

Figure 7:
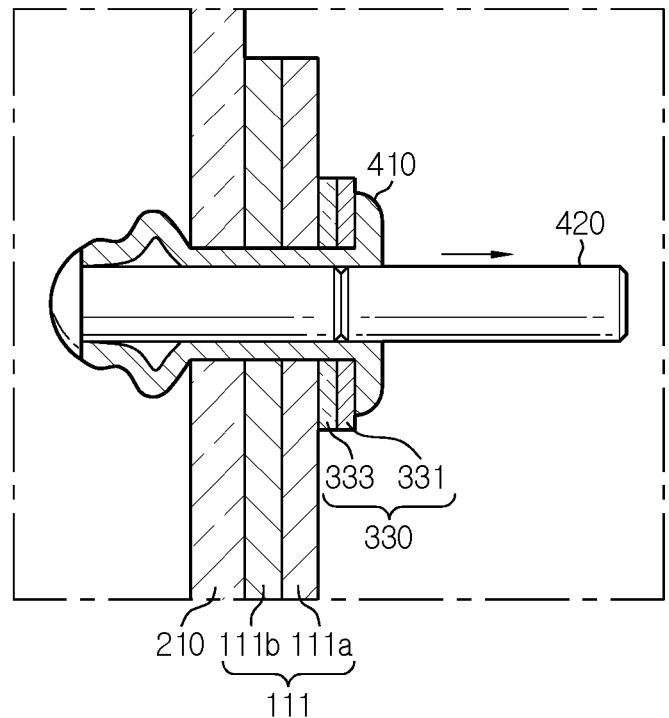
FIG. 7 is a side view taken at section A-A' of FIG. 4 showing another step of the riveting process of the electrode lead and the sensing part.
Figure 8:
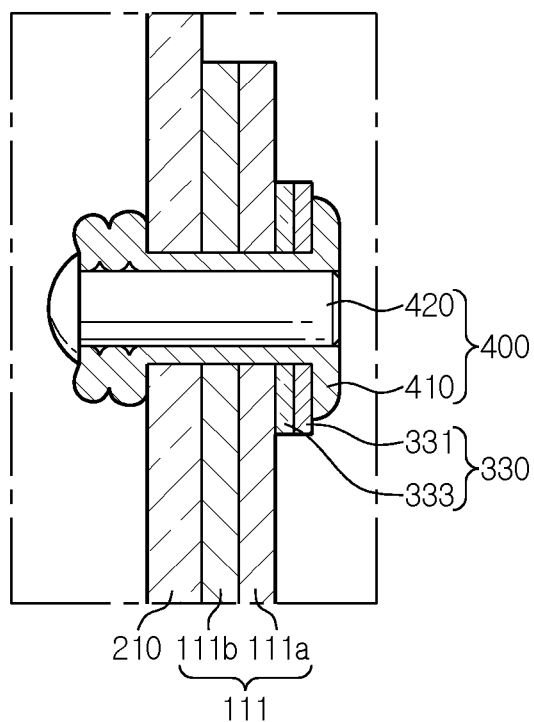
FIG. 8 is a side view taken at section A-A' of FIG. 4 showing another step of the riveting process of the electrode lead and the sensing part.

Then, as shown in FIG. 7, the mandril 420 is held and pulled by using the tool to start molding the body 410. When the body 410 is completely molded and thus the sensing part 330, lead overlapping portion 111, and support frame 210 are adhered, the mandril 420 is cut and only a part of the mandril 420 is left inside the body 410 as shown in FIG. 8.

Accordingly, the sensing part 330 and lead overlapping portion 111 are combined and connected to each other by the rivet member 400, and may be integrally fixed and combined to the support frame 210.

Additionally, the rivet member 400 may be used to fix another portion of the lead overlapping portion 111 to the support frame 210.

A configuration of directly connecting and fixing the sensing part 330 and lead overlapping portion 111 via the riveting method is able to be easily operated even by an unskilled worker compared to a laser welding method, and has excellent coupling strength.

Also, generally, the positive electrode lead 111a is manufactured by aluminum (Al) and the negative electrode lead 111b is manufactured by copper (Cu), and when dissimilar metals are welded and combined, combining strength may be low. However, the riveting method according to the present disclosure is not subject to a type of a metal, and thus is further advantageous in combining dissimilar metals.

Also, a combining range of a parent material is wide in the riveting method, and thus, unlike the present embodiment, it is possible to configure the lead overlapping portion 111 by stacking two or at least three positive electrode leads 111a and negative electrode leads 111b and riveting the lead overlapping portion 111 and sensing part 330.

Figure 9:
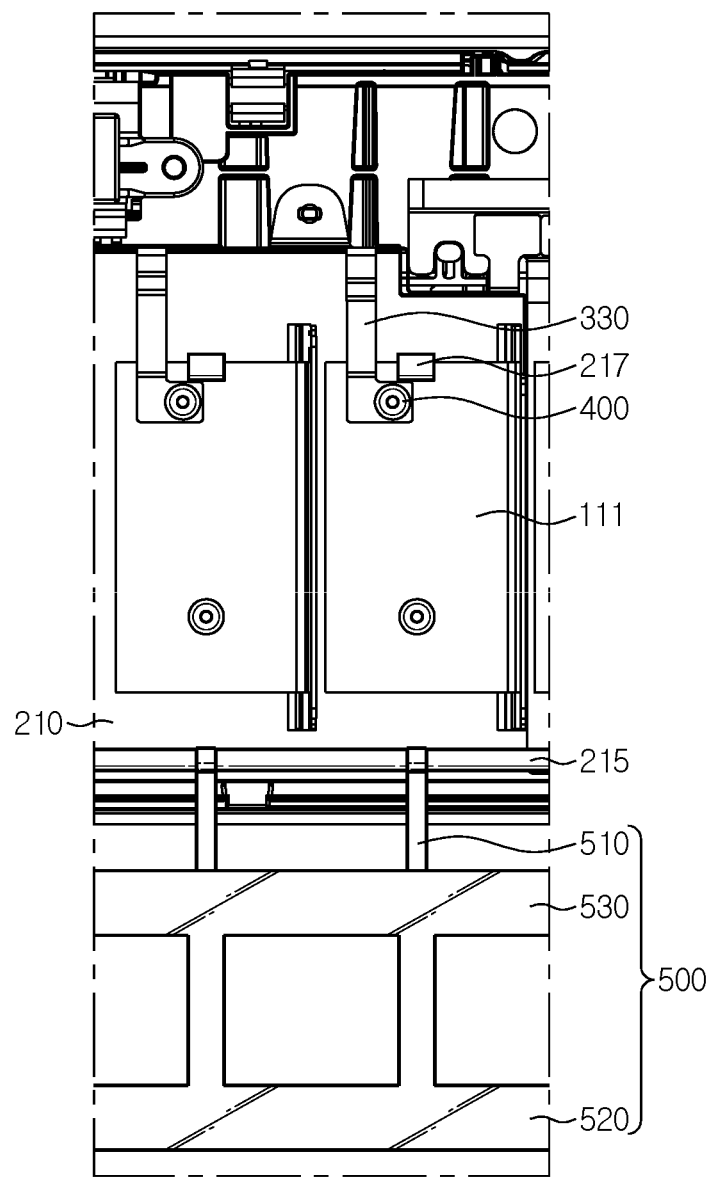
FIG. 9 is a front view of the battery module of FIG. 4 and showing a configuration of a lead holding member of a battery module according to another embodiment of the present disclosure.
Figure 10:
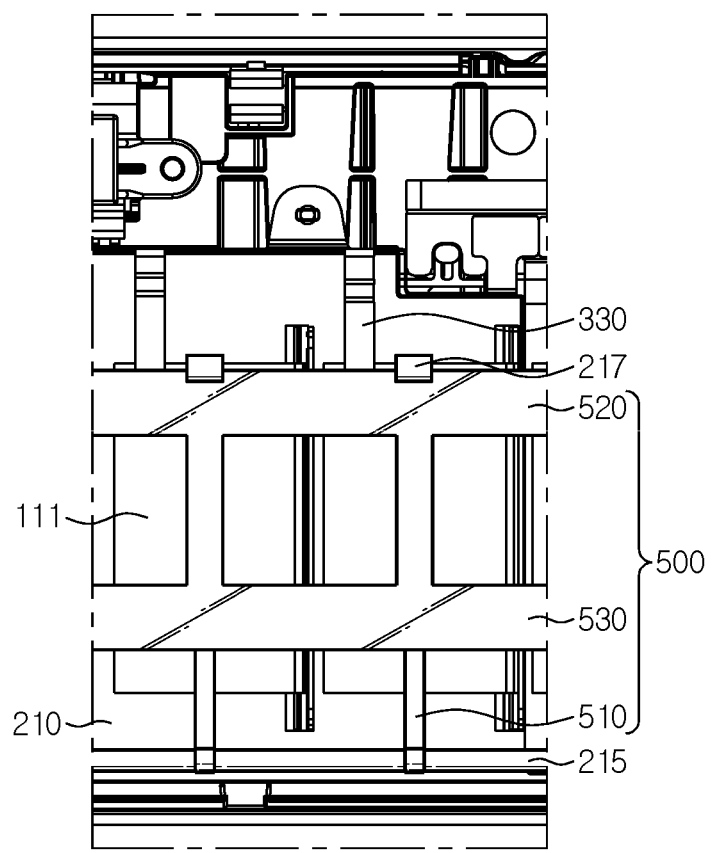
FIG. 10 is a front view showing the lead holding member of FIG. 9 adhered to a support frame.

FIG. 9 is a view corresponding to FIG. 4 and showing a configuration of a lead holding member of a battery module according to another embodiment of the present disclosure, and FIG. 10 is a view showing a state in which the lead holding member of FIG. 9 is adhered to a support frame.

Then, a battery module according to another embodiment of the present disclosure will be described with reference to FIGS. 9 and 10.

Like reference numerals as the above embodiments denote like elements, and differences from the above embodiments will be mainly described while omitting redundant descriptions about the like elements.

The battery module according to another embodiment of the present disclosure further includes a lead holding member 500 compared to the battery module 10 of the above embodiments.

The lead holding member 500 is an element for preventing movement of the lead overlapping portion 111 and preventing short occurrence.

In detail, the lead holding member 500 includes a shaft 510, a first holding bar 520, and a second holding bar 530. Also, the support frame 210 may include a support rod 215 at a bottom end portion thereof, and at least one latch 217 at a location spaced apart from the support rod 215 by a predetermined interval in an upward direction, so as to attach and detach the lead holding member 500.

The shaft 510 of the lead holding member 500 has one end portion combined to the support rod 215 via a hinge to be rotatable. For example, the one end portion of the shaft 510 may be inserted into the support rod 215, in a ring shape of an arc form. There may be a plurality of the shafts 510.

The first holding bar 520 and second holding bar 530 may be connected to the shaft 510 while extending in a direction crossing the shaft 510, and lengths thereof may correspond to a left-and-right width of the cell stack 100.

The first holding bar 520 and second holding bar 530 may be connected to the shaft 510 at locations spaced apart from each other by a predetermined interval such as to pressurize different regions of the lead overlapping portion 111.

By using such a configuration, while in the state as shown in FIG. 9, the lead holding member 500 is rotated in an upward direction such that the lead holding member 500 is adhered to the front portion of the support frame 210, and the latch 217 of the support frame 210 is latched and locked to the first holding bar 520.

Here, the first holding bar 520 may be adhered to the front portion of the support frame 210 so that a connection portion of the lead overlapping portion 111 and the sensing part 330 is provided between the first holding bar 520 and the support frame 210, and the second holding bar 530 may be adhered to the front portion of the support frame 210 so that a bottom portion of the lead overlapping portion 111 is provided between the second holding bar 530 and the support frame 210.

According to such a lead holding member 500, unlike the above embodiments, movement of the sensing part 330 and lead overlapping portion 111 may be prevented without having to rivet even the support frame 210 while connecting the sensing part 330 and the lead overlapping portion 111. In other words, it is possible to directly connect only the sensing part 330 and lead overlapping portion 111 to the rivet member 400, and adhere and fix the same to the front portion of the support frame 210 by using the lead holding member 500.

Also, in the above embodiments, the isolation plate 213 is provided to prepare for, for example, a short that unexpectedly occurs when an arbitrary metal object contacts between the neighboring lead overlapping portions 111 during an assembling process of the battery module, but in the present embodiment, the lead overlapping portions 111 are covered by the lead holding member 500, and thus the isolation plates 213 may be removed and the lead holding member 500 may perform a short preventing function.

As described above, the battery module 10 according to the present disclosure may have a simplified assembly structure compared to the battery module 10 of the prior art by omitting a bus bar that has been generally used in the prior art for electric connection and voltage sensing of the battery cells 110, and directly connecting and fixing the voltage sensing member 300 and the electrode leads of the battery cells 110 by using the rivet member 400 instead.

Also, compared to the battery module 10 of the prior art in which the electrode lead, bus bar, and voltage sensing member 300 are combined via a laser welding method, the battery module 10 of the present disclosure may consume less manufacturing costs because the bus bar is omitted and the riveting method that is relatively inexpensive is applied.

Meanwhile, a battery pack according to the present disclosure may include one or more battery modules according to the present disclosure. Also, the battery pack according to the present disclosure may further include, in addition to the battery module, a pack case for accommodating the battery module, various devices for controlling charging and discharging of each battery module, for example, a master BMS, a current sensor, a fuse, and the like.

The battery module according to the present disclosure may be applied to a vehicle, such as an electric vehicle or a hybrid vehicle. In other words, the vehicle may include the battery module according to the present disclosure.

As described above, although the present disclosure has been described with reference to limited embodiments and drawings, the present disclosure is not limited thereto, and various modifications and variations may be implemented by one of ordinary skill in the art within the technical ideas of the present disclosure and the equivalent scope of the claims described below.

Meanwhile, terms used to indicate directions such as up, down, left, and right are used in the present specification, but these terms are merely for convenience of description, and it would be obvious to one of ordinary skill in the art that the terms may vary depending on a location of a target object or a location of an observer.

What is claimed is:

1. A battery module comprising:
    a cell stack having battery cells stacked along a first direction and at least one lead overlapping portion formed by overlapping electrode leads of the battery cells; and
    a voltage sensing member having at least one sensing part directly connected to the at least one lead overlapping portion,
    wherein each lead overlapping portion and each sensing part are fixed and combined to each other by a fastener such that an insulating part of the voltage sensing member opposite to the at least one sensing part directly contacts the fastener.

2. The battery module of claim 1, further comprising a support frame having slits formed at predetermined intervals along a second direction of the battery cells, the support frame being disposed at a front portion or a rear portion of the cell stack,
    wherein each lead overlapping portion extends through a corresponding slit to a front portion of the support frame and is arranged along a surface of the support frame.

3. The battery module of claim 2, wherein each sensing part, each lead overlapping portion, and the support frame are integrally fixed and combined by the fastener.

4. The battery module of claim 3, wherein each sensing part, each lead overlapping portion, and the support frame have holes configured to align with each other to receive the fastener, and the fastener being a blind rivet interposed in the holes.

5. The battery module of claim 2, further comprising a lead holding member having a first holding bar adhered to the front portion of the support frame, a connection portion of the lead overlapping portion and the sensing part being disposed between the first holding bar and the support frame, the lead holding member being detachably mounted to the support frame.

6. The battery module of claim 5, wherein the lead holding member comprises:
    a shaft combined to a lower portion of the support frame via a hinge and connected to the first holding bar; and
    a second holding bar connected to the shaft and extending in parallel to the first holding bar, the second holding bar being spaced away from the first holding bar by a predetermined distance.

7. The battery module of claim 6, wherein the support frame comprises at least one latch to attach and lock the first holding bar to the support frame.

8. The battery module of claim 1, wherein the voltage sensing member comprises:
    a first main body portion disposed at a top portion of the cell stack and extending along a longitudinal direction thereof; and
    a second main body portion extending in a width direction of the cell stack at first and second ends of the first main body portion,
    wherein each of the at least one sensing part extends from the second main body portion to contact each of the at least one lead overlapping portion.

9. The battery module of claim 1, wherein the voltage sensing member comprises a flat flexible cable (FFC) or a flexible printed circuit board (FPCB).

10. A battery pack comprising the battery module according claim 1.

11. A vehicle comprising the battery pack according to claim 10.

12. The battery module of claim 1, wherein the fastener is a rivet.

13. A battery module comprising:
    a cell stack having battery cells stacked along a first direction and at least one lead overlapping portion formed by overlapping electrode leads of the battery cells;
    a voltage sensing member having at least one sensing part directly connected to the at least one lead overlapping portion, and
    a support frame having slits formed at predetermined intervals along a second direction of the battery cells, the support frame being disposed at a front portion or a rear portion of the cell stack,
    wherein each lead overlapping portion and each sensing part are fixed and combined to each other by a fastener, each lead overlapping portion extends through a corresponding slit to a front portion of the support frame and is arranged along a surface of the support frame.

14. The battery module of claim 13, wherein each sensing part, each lead overlapping portion, and the support frame are integrally fixed and combined by the fastener, each sensing part, each lead overlapping portion, and the support frame have holes configured to align with each other to receive the fastener, and the fastener being a blind rivet interposed in the holes.

15. The battery module of claim 13, further comprising a lead holding member having a first holding bar adhered to the front portion of the support frame, a connection portion of the lead overlapping portion and the sensing part being disposed between the first holding bar and the support frame, the lead holding member being detachably mounted to the support frame.

16. The battery module of claim 15, wherein the lead holding member comprises:
   a shaft combined to a lower portion of the support frame via a hinge and connected to the first holding bar; and
   a second holding bar connected to the shaft and extending in parallel to the first holding bar, the second holding bar being spaced away from the first holding bar by a predetermined distance.

17. The battery module of claim 13, wherein the voltage sensing member comprises:
   a first main body portion disposed at a top portion of the cell stack and extending along a longitudinal direction thereof; and
   a second main body portion extending in a width direction of the cell stack at first and second ends of the first main body portion,
   wherein each of the at least one sensing part extends from the second main body portion to contact each of the at least one lead overlapping portion.

18. The battery module of claim 13, wherein the voltage sensing member comprises a flat flexible cable (FFC) or a flexible printed circuit board (FPCB).

19. A battery pack comprising the battery module according claim 13.

20. A vehicle comprising the battery pack according to claim 19.

* * * * *